US009161364B2

(12) United States Patent
Chen et al.

(10) Patent No.: US 9,161,364 B2
(45) Date of Patent: Oct. 13, 2015

(54) METHODS AND APPARATUS FOR ASSIGNMENT DEPENDENT DOWNLINK CHANNEL PROCESSING FOR WIRELESS NETWORKS

(71) Applicant: QUALCOMM Incorporated, San Diego, CA (US)

(72) Inventors: Wanshi Chen, San Diego, CA (US); Tao Luo, San Diego, CA (US); Aleksandar Damnjanovic, Del Mar, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 151 days.

(21) Appl. No.: 13/713,062

(22) Filed: Dec. 13, 2012

(65) Prior Publication Data
US 2013/0163529 A1   Jun. 27, 2013

Related U.S. Application Data

(60) Provisional application No. 61/578,665, filed on Dec. 21, 2011.

(51) Int. Cl.
*H04W 72/04* (2009.01)
*H04J 3/16* (2006.01)
*H04W 72/08* (2009.01)
*H04J 11/00* (2006.01)
*H04W 28/04* (2009.01)
*H04L 5/00* (2006.01)

(52) U.S. Cl.
CPC ........... *H04W 72/082* (2013.01); *H04J 11/005* (2013.01); *H04L 5/0073* (2013.01); *H04W 28/04* (2013.01); *H04L 5/001* (2013.01)

(58) Field of Classification Search
USPC .................................. 370/252, 328, 329, 465
See application file for complete search history.

(56) References Cited

U.S. PATENT DOCUMENTS

2007/0202903 A1*  8/2007  Ge et al. .................. 455/502
2008/0076432 A1*  3/2008  Senarath et al. ........... 455/442
2010/0278063 A1  11/2010  Kim et al.
2011/0256861 A1  10/2011  Yoo et al.
(Continued)

OTHER PUBLICATIONS

Huawei H., et al., "Interference level for eICIC demodulation test," 3GPP TSG-RAN WG4 Meeting #60bis, Zhuhai, China, Oct. 10-14, 2011, R4-114884, vol. Ran Wg4, No. Zhuhai, XP050544015, 8 pages.

(Continued)

*Primary Examiner* — Andrew Lee
(74) *Attorney, Agent, or Firm* — Patterson & Sheridan, LLP

(57) ABSTRACT

Aspects of the present disclosure relates generally to communication systems, and more particularly, to apparatus and techniques for handling, within resources of an assigned channel, different availability of interference. Aspects generally include determining different portions of resources for an assigned downlink channel that are subject to at least one of different levels or different types of interference, and selecting different techniques for processing the different portions of the resources, wherein each technique is selected based on the corresponding level or type of interference. In aspects, a fixed pattern or amount of interference for the resources may be selected based on the different levels or the different types of interference and a technique for processing the resources is selected, wherein the technique is selected based on the selected fixed pattern or amount of interference.

50 Claims, 14 Drawing Sheets

(56) References Cited

U.S. PATENT DOCUMENTS

| | | | |
|---|---|---|---|
| 2012/0026964 A1* | 2/2012 | Koivisto et al. | 370/329 |
| 2012/0082052 A1* | 4/2012 | Oteri et al. | 370/252 |
| 2012/0122472 A1* | 5/2012 | Krishnamurthy et al. | 455/456.1 |
| 2013/0033998 A1* | 2/2013 | Seo | H04W 24/00 370/252 |
| 2013/0208604 A1* | 8/2013 | Lee et al. | 370/252 |
| 2013/0235738 A1* | 9/2013 | Siomina et al. | 370/252 |
| 2013/0301456 A1* | 11/2013 | Siomina et al. | 370/252 |
| 2014/0086371 A1* | 3/2014 | Li et al. | 375/346 |
| 2014/0112216 A1* | 4/2014 | Seo et al. | 370/280 |
| 2014/0126403 A1* | 5/2014 | Siomina | 370/252 |
| 2014/0128115 A1* | 5/2014 | Siomina et al. | 455/501 |
| 2014/0146689 A1* | 5/2014 | Gaur et al. | 370/252 |

OTHER PUBLICATIONS

International Search Report and Written Opinion—PCT/US2012/069639—ISA/EPO—Mar. 5, 2013.

Qualcomm Incorporated: "Analysis of interference levels in eICIC in ABS and non-ABS subframes", 3GPP Draft; R4-115720, Mobile Competence Centre, 650, Route Des Lucioles, F-06921 Sophia-Antipolis Cedex, France, vol. RAN WG4, No. San Francisco, USA, Nov. 7, 2011, XP050567414, 8 pages.

Qualcomm Incorporated: "Way forward on interference level setting in eICIC ", 3GPP Draft, R4-115792, Mobile Competence Centre, 650, Route Des Lucioles, F-06921 Sophia-Antipolis Cedex, vol. RAN WG4, No. San Francisco, Nov. 7, 2011, XP050567456, 4 pages.

* cited by examiner

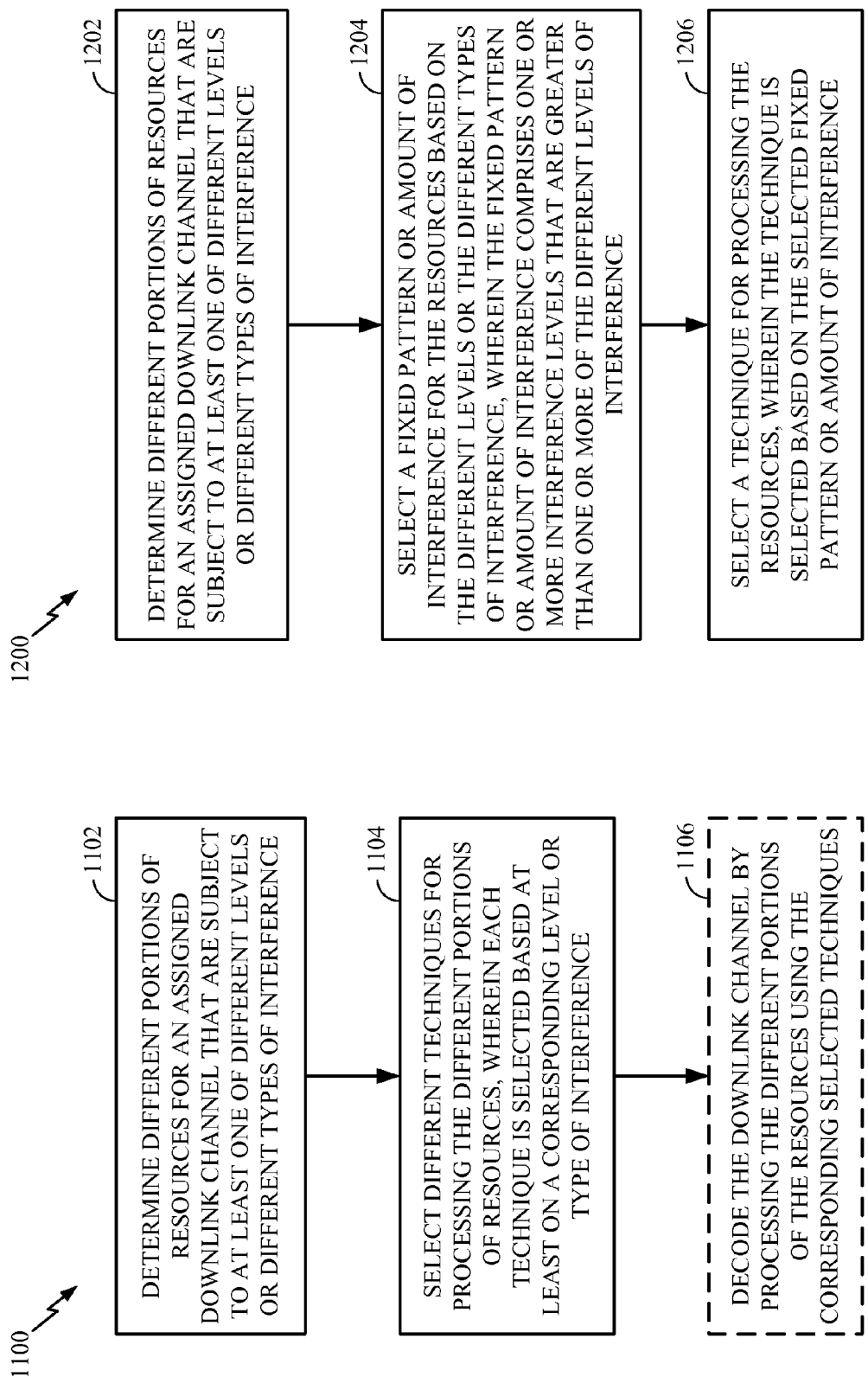

METHODS AND APPARATUS FOR ASSIGNMENT DEPENDENT DOWNLINK CHANNEL PROCESSING FOR WIRELESS NETWORKS

CLAIM OF PRIORITY UNDER 35 U.S.C. §119

The present application for patent claims priority to U.S. Provisional Application No. 61/578,665, entitled, "Methods and Apparatus for Assignment Dependent Downlink Channel Processing for Wireless Networks," filed Dec. 21, 2011, and assigned to the assignee hereof, which is hereby expressly incorporated by reference herein.

TECHNICAL FIELD

The present disclosure relates generally to communication systems, and more particularly, to methods and apparatus for handling, within resources of an assigned channel, different availability of interference.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

Certain aspects of the present disclosure provide a method for wireless communications. The method generally includes determining different portions of resources for an assigned downlink channel that are subject to at least one of different levels or different types of interference, and selecting different techniques for processing the different portions of the resources, wherein each technique is selected based at least on a corresponding level or type of interference.

Certain aspects of the present disclosure provide a method for wireless communications. The method generally includes determining different portions of resources for an assigned downlink channel that are subject to at least one of different levels or different types of interference, selecting a fixed pattern or amount of interference for the resources based on the different levels or the different types of interference, wherein the fixed pattern or amount of interference comprises one or more interference levels that are greater than one or more of the different levels of interference, and selecting a technique for processing the resources, wherein the technique is selected based on the selected fixed pattern or amount of interference.

Certain aspects of the present disclosure provide an apparatus for wireless communications. The apparatus generally includes means for determining different portions of resources for an assigned downlink channel that are subject to at least one of different levels or different types of interference, and means for selecting different techniques for processing the different portions of the resources, wherein each technique is selected based at least on a corresponding level or type of interference.

Certain aspects of the present disclosure provide an apparatus for wireless communications. The apparatus generally includes means for determining different portions of resources for an assigned downlink channel that are subject to at least one of different levels or different types of interference, means for selecting a fixed pattern or amount of interference for the resources based on the different levels or the different types of interference, wherein the fixed pattern or amount of interference comprises one or more interference levels that are greater than one or more of the different levels of interference, and means for selecting a technique for processing the resources, wherein the technique is selected based on the selected fixed pattern or amount of interference.

Certain aspects provide a computer-program product for wireless communications, comprising a non-transitory computer-readable medium having instructions stored thereon, the instructions being executable by one or more processors. The instructions generally include instructions for determining different portions of resources for an assigned downlink channel that are subject to at least one of different levels or different types of interference, and instructions for selecting different techniques for processing the different portions of the resources, wherein each technique is selected based at least on a corresponding level or type of interference.

Certain aspects provide a computer-program product for wireless communications, comprising a non-transitory computer-readable medium having instructions stored thereon, the instructions being executable by one or more processors. The instructions generally include instructions for determining different portions of resources for an assigned downlink channel that are subject to at least one of different levels or different types of interference, instructions for selecting a fixed pattern or amount of interference for the resources based on the different levels or the different types of interference, wherein the fixed pattern or amount of interference comprises one or more interference levels that are greater than one or more of the different levels of interference, and instructions for selecting a technique for processing the resources, wherein the technique is selected based on the selected fixed pattern or amount of interference.

Certain aspects of the present disclosure provide an apparatus for wireless communications. The apparatus generally includes at least one processor and a memory coupled to the at least one processor. The processor is configured to determine different portions of resources for an assigned downlink channel that are subject to at least one of different levels or different types of interference, and select different techniques for processing the different portions of the resources, wherein each technique is selected based at least on a corresponding level or type of interference.

Certain aspects of the present disclosure provide an apparatus for wireless communications. The apparatus generally includes at least one processor and a memory coupled to the at least one processor. The processor is configured to determine different portions of resources for an assigned downlink channel that are subject to at least one of different levels or different types of interference, select a fixed pattern or amount of interference for the resources based on the different levels or the different types of interference, wherein the fixed pattern or amount of interference comprises one or more interference levels that are greater than one or more of the different levels of interference, and select a technique for processing the resources, wherein the technique is selected based on the selected fixed pattern or amount of interference.

BRIEF DESCRIPTION OF THE DRAWINGS

FIG. 11 illustrates example operations that may be performed by a user equipment for applying different interference mitigation techniques on different portions of resources, in accordance with certain aspects of the present disclosure.

FIG. 12 illustrates example operations that may be performed by a wireless device to manage interference, in accordance with certain aspects of the present disclosure.

DETAILED DESCRIPTION

Figure 1:
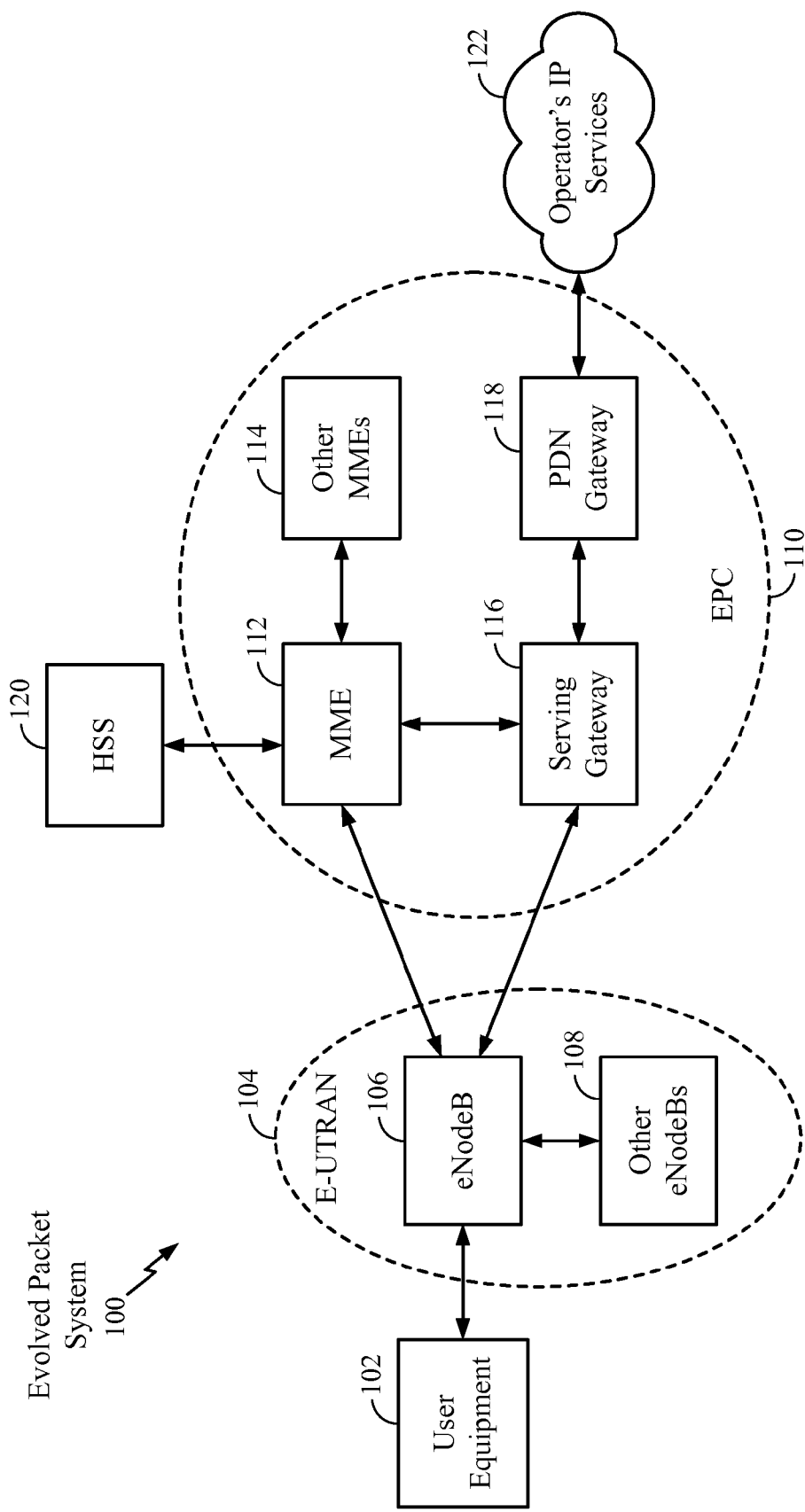
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary aspects, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's IP Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108. The eNB 106 provides user and control plane protocol terminations toward the UE 102. The eNB 106 may be connected to the other eNBs 108 via an X2 interface (e.g., backhaul). The eNB 106 may also be referred to as a base station, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected by an S1 interface to the EPC 110. The EPC 110 includes a Mobility Management Entity (MME) 112, other MMEs 114, a Serving Gateway 116, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include the Internet, the Intranet, an IP Multimedia Subsystem (IMS), and a PS Streaming Service (PSS).

Figure 2:
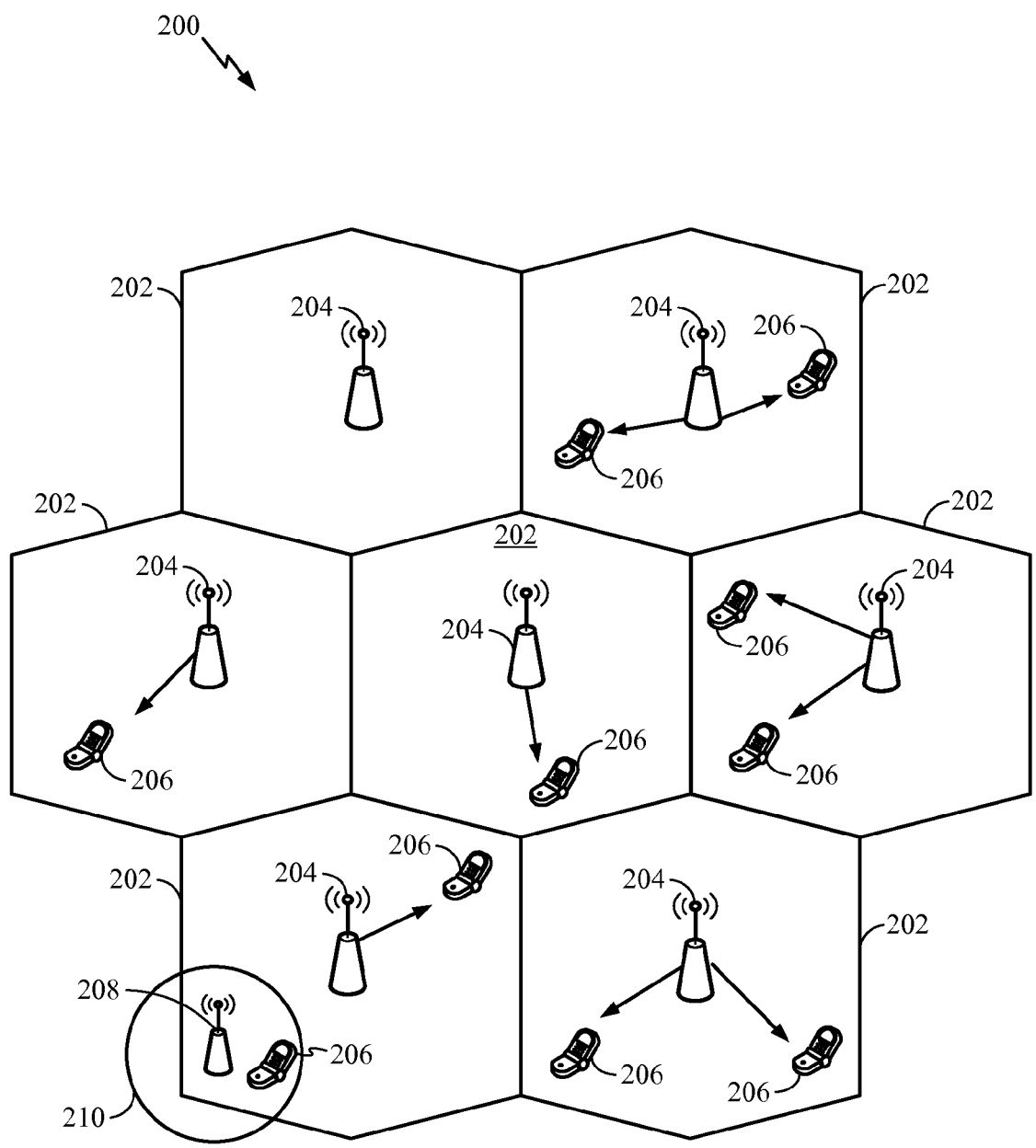
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. A lower power class eNB 208 may be referred to as a remote radio head (RRH). The lower power class eNB 208 may be a femto cell (e.g., home eNB (HeNB)), pico cell, or micro cell. The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116.

The modulation and multiple access scheme employed by the access network 200 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data streams may be transmitted to a single UE 206 to increase the data rate or to multiple UEs 206 to increase the overall system capacity. This is achieved by spatially precoding each data stream (e.g., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
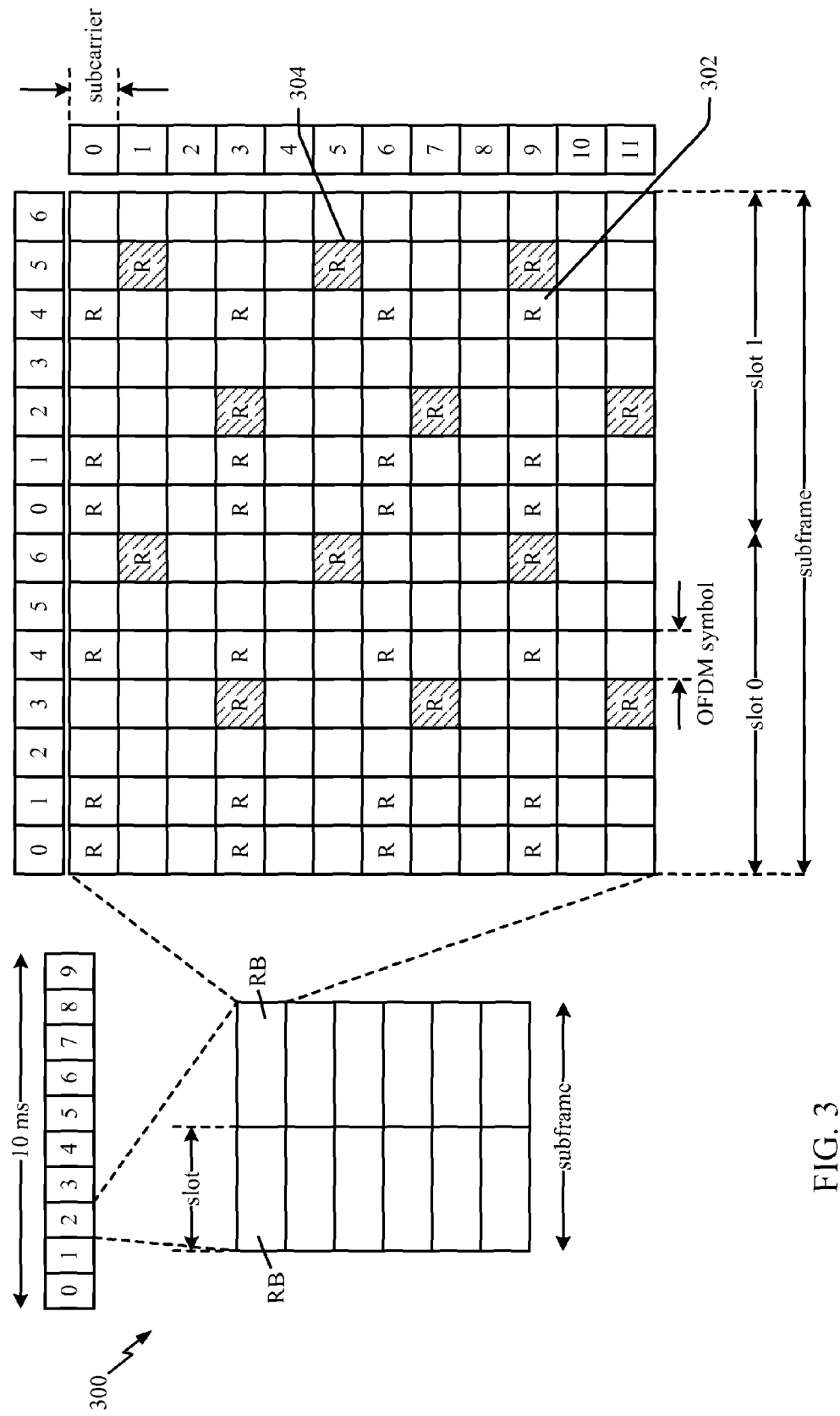
FIG. 3 is a diagram illustrating an example of a downlink (DL) frame structure in the Long Term Evolution (LTE) standard.

FIG. 3 is a diagram 300 illustrating an example of a DL frame structure in LTE. A frame (10 ms) may be divided into 10 equally sized sub-frames. Each subframe may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, as indicated as R 302, 304, include DL reference signals (DL-RS). The DL-RS include Cell-specific RS (CRS) (also sometimes called common RS) 302 and UE-specific RS (UE-RS) 304. According to LTE Rel-8/9/10, the eNB may transmit a cell-specific reference signal (CRS) across the system bandwidth for each cell supported by the eNB. The CRS may be transmitted in certain symbol periods of each subframe. However, as described below, this may not be the case for future LTE releases. UE-RS signals 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
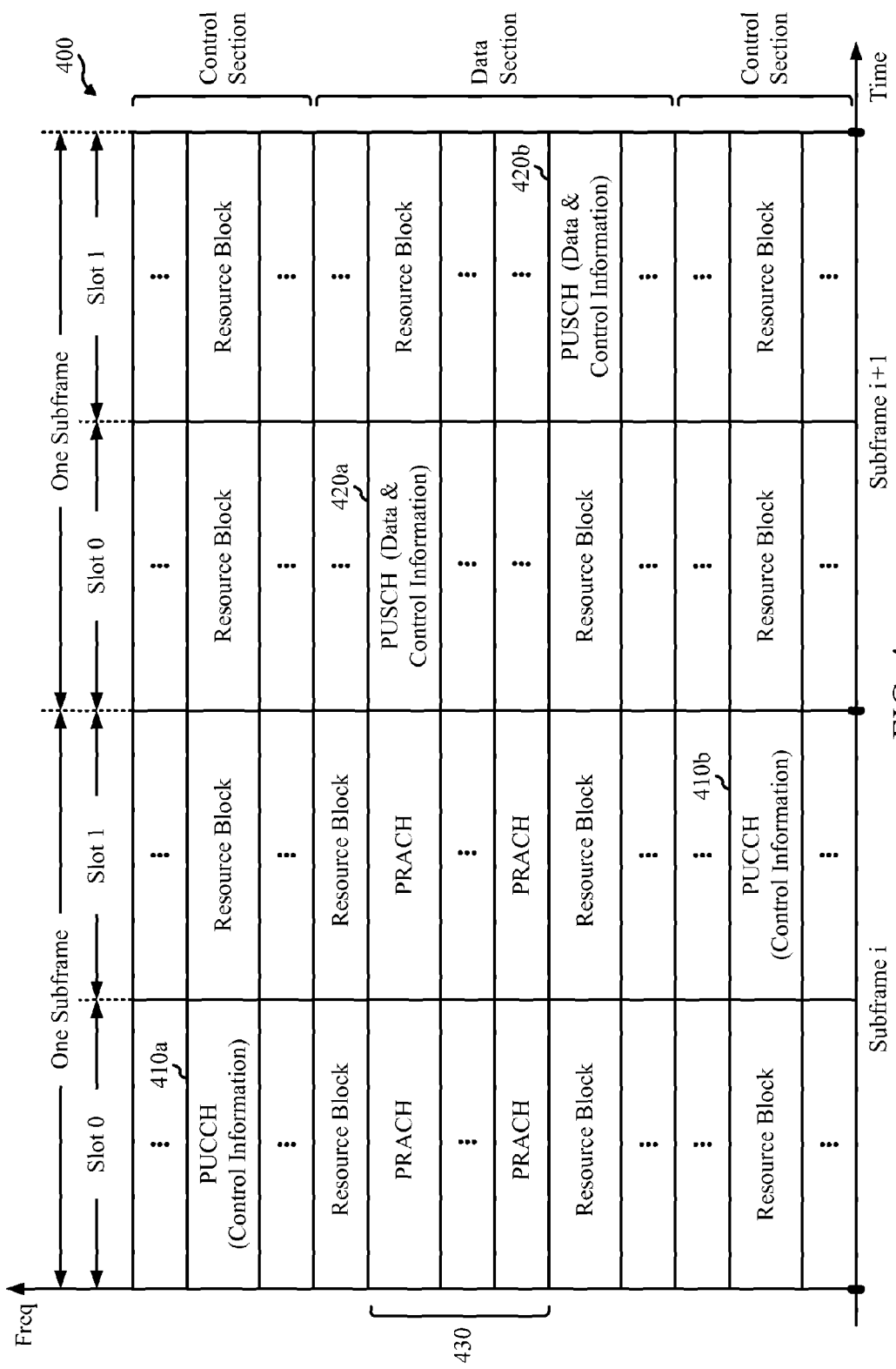
FIG. 4 is a diagram illustrating an example of an uplink (UL) frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
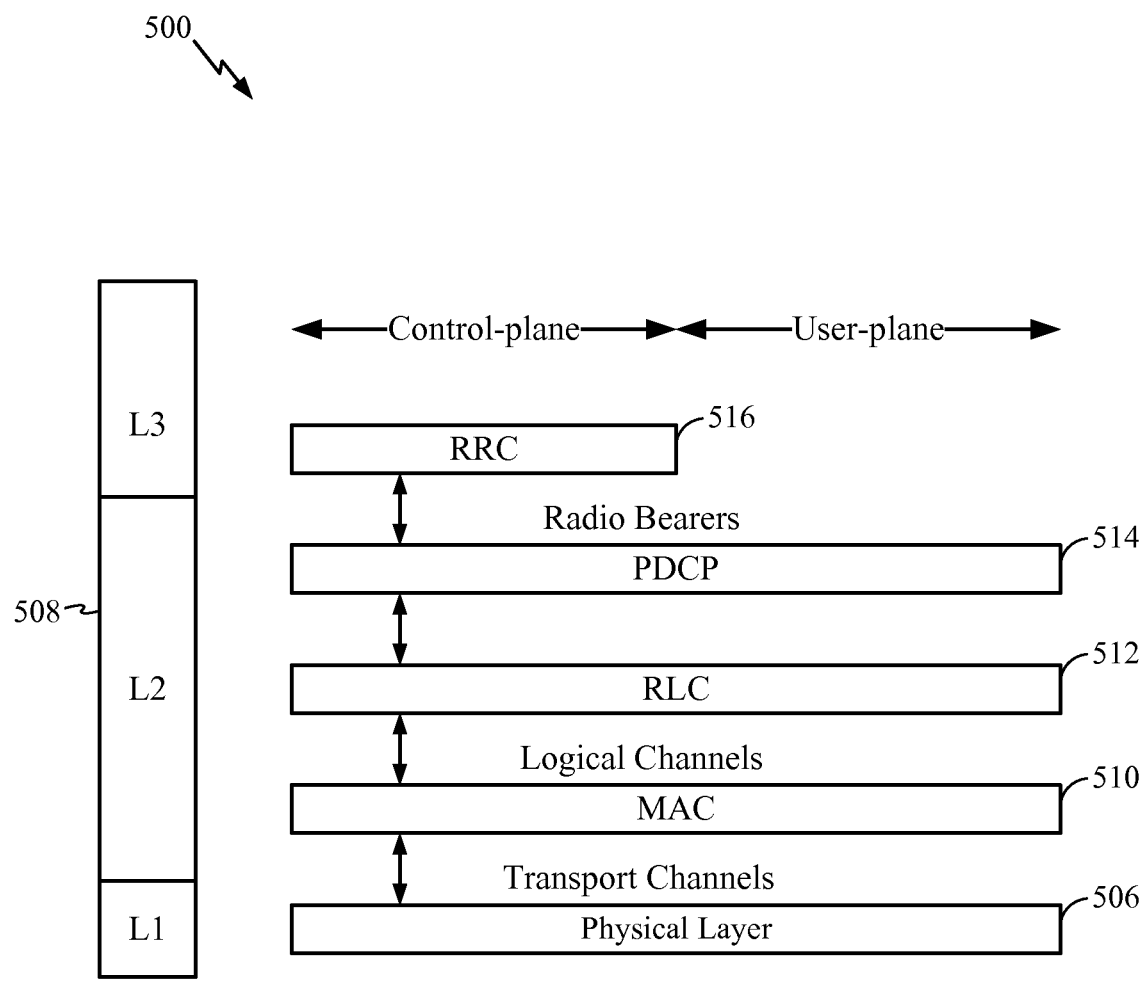
FIG. 5 is a diagram illustrating an example of a radio protocol architecture for the user and control plane.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (e.g., radio bearers) and for configuring the lower layers using RRC signaling between the eNB and the UE.

Figure 6:
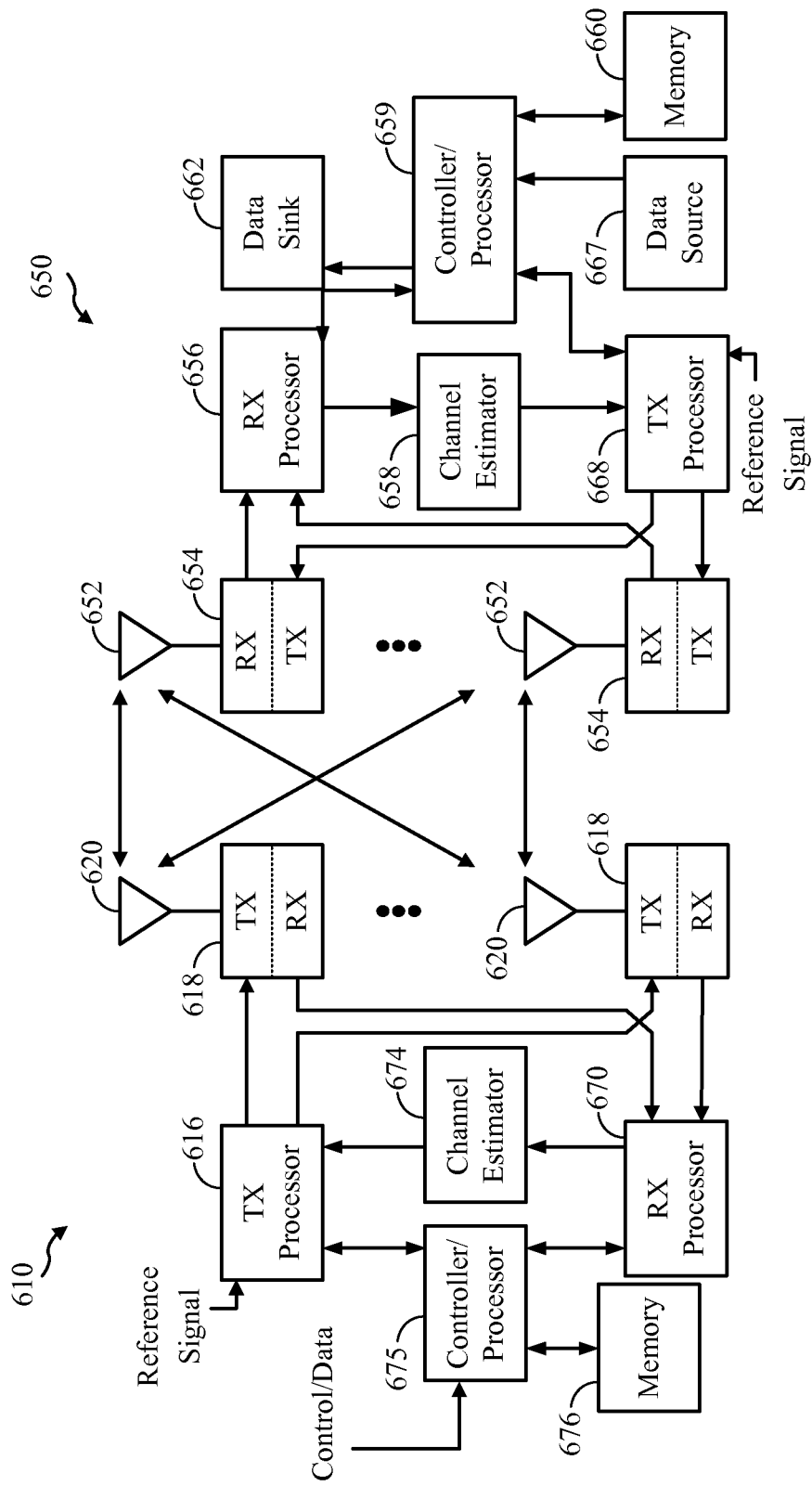
FIG. 6 is a diagram illustrating an example of an evolved Node B and user equipment in an access network, in accordance with certain aspects of the present disclosure.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The TX processor 616 implements various signal processing functions for the L1 layer (e.g., physical layer). The signal processing functions includes coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each receiver 654RX receives a signal through its respective antenna 652. Each receiver 654RX recovers information modulated onto an RF carrier and provides the information to the receiver (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the control/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

An Example Assignment Dependent Downlink Channel Processing for Wireless Networks Certain aspects of the present disclosure present methods and apparatus for handling different availability of interference within resources of an assigned channel. For example, different levels and/or types of interference may be available for different portions of resources. Therefore, a user equipment may determine different portions of resources for an assigned downlink channel that are subject to different levels and/or different types of interference. The UE may select different techniques (e.g., interference cancellation, puncturing, rate matching, and the like) for processing the different portions of resources based on the corresponding level and/or type of interference.

A heterogeneous network (HetNet) generally includes cells of different power classes. For example, the HetNet may include macro cells, pico cells, femto cells and the like. These cells may have different transmit power and/or different antenna gain. As an example, macro cells and pico cells may have 16 dB difference in transmit power and/or 9 dB difference in antenna gain. If the best DL received power is used for UE association with a serving cell (that may be a macro cell, pico cell and/or the like), cells that operate in low-power classes may have limited coverage. However, cell range expansion (CRE) in HetNet may improve the coverage of low-power cells and, hence improve system performance. In other words, when using CRE, UEs may associate with a cell that does not have the best (e.g., highest) received DL power.

Figure 7:
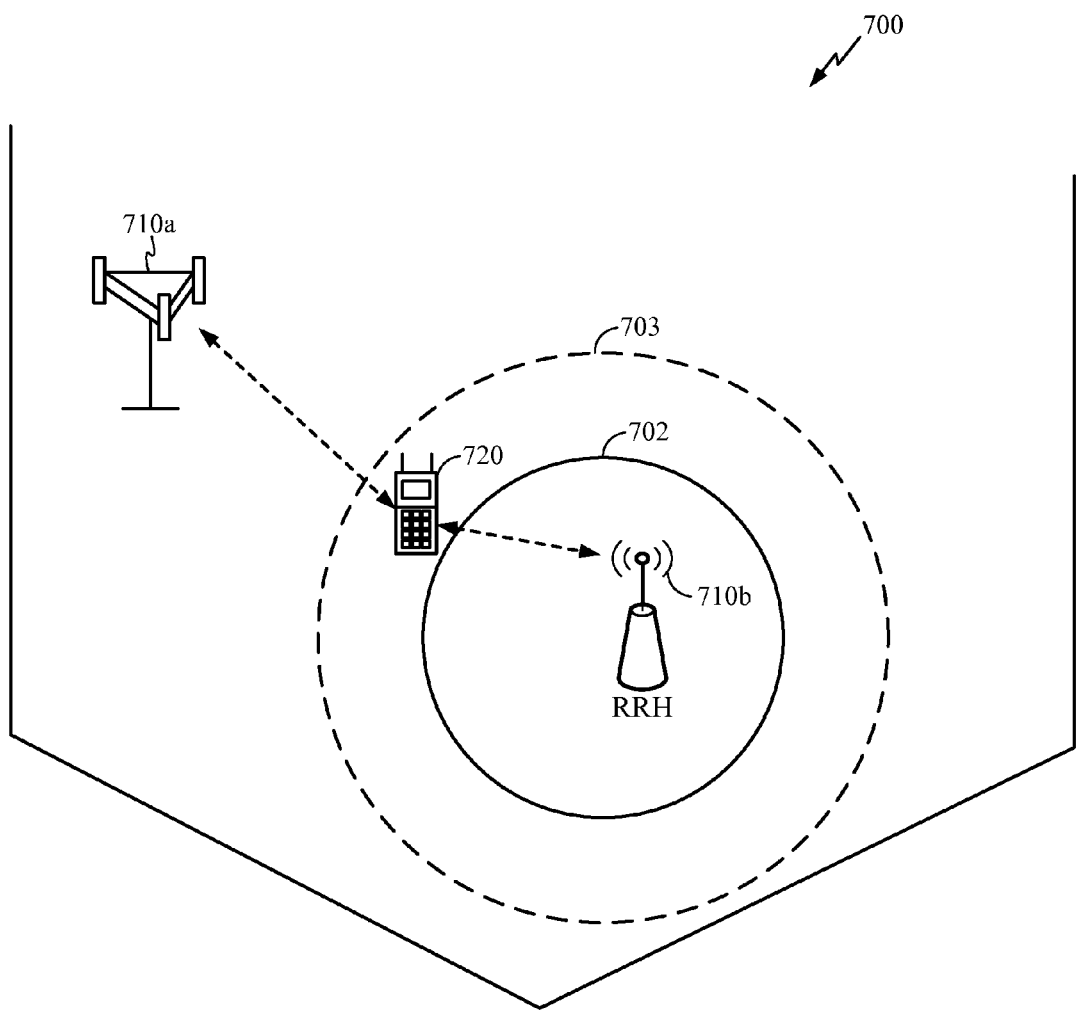
FIG. 7 is a diagram illustrating a range expanded cellular region in a heterogeneous network, in accordance with certain aspects of the present disclosure.

FIG. 7 is a diagram 700 illustrating a heterogeneous network including a high-power class eNB 710a (e.g., a macro cell) and a low-power class eNB, such as the RRH 710b that may be a pico cell. The RRH 710b may have a range expanded cellular region 703 that is expanded from the cellular region 702. The cell range expansion may be performed through enhanced inter-cell interference coordination (eICIC) between the RRH 710b and the macro eNB 710a, and through interference cancellation performed by the UE 720.

For UEs under CRE that are served by low-power cells, overwhelming interference may be seen from higher power cells (e.g., macro cells). For example, in FIG. 7, the UE 720 is served by a low-power cell (e.g., RRH 710b). In this example, the macro eNB 710a transmits high-power DL signals, which are received by the UE 720. The UE 720 also receives low-power DL signals from the RRH 710b (e.g., its serving base station). The high-power DL signals that are received from the macro cell 710a impose strong interference on the low-power DL signals received from the RRH 710b. The UE 720 may need to perform interference cancellation techniques to remove the interference from the received low-power DL signals.

In LTE Rel-10, time domain enhanced inter-cell interference coordination (eICIC) is supported for HetNet. In time domain eICIC, subframe utilization across different cells may be coordinated in time through backhaul signaling and/or operation and maintenance (OAM) configuration of almost blank subframe (ABS) patterns. ABSs are subframes with reduced transmit power (e.g., including no transmission) on some physical channels and/or reduced activity on certain channels. As a result, interfering cells can configure ABS (e.g., by either not transmitting or transmitting with minimal power) on the subframes that are simultaneous in time with signal transmissions that are intended for CRE UEs (e.g., DL transmissions to CRE UEs by low-power cells). Configuring ABS on these subframes reduces the interference on the received signals of the CRE UEs that are served by low-power cells. However, certain signals may still need to be sent by the interfering cells at full power. For example, the interfering cells may still need to send CRS (common reference signal) at scheduled times. These transmissions may impose strong interference on the received DL signals from low-power serving base stations.

Therefore, even if the interfering cells are configured with ABS, CRE UEs may still need to handle interference due to CRS of the interfering cells and the like. It should be noted that CRS may be present in any subframe in an LTE Rel-8/9/10 carrier. In general, CRSs that are transmitted by interfering cells may have similar or different CRS offsets compared to the CRS offsets used by the serving cell of the CRE UEs. In general, if the CRSs of the interferers have the same CRS offset as the CRS offset of the serving cell for CRE UEs, the CRSs may collide (e.g., colliding CRS). Otherwise, if the CRSs have different offsets, they may not collide with each other (e.g., non-colliding CRS). In either case, the UE may need to cancel the interference caused by CRS of the interfering cells. As an example, for two transmit antennas, three possible CRS offsets in frequency may be used. Therefore, colliding CRSs may be likely.

For certain aspects, UEs may handle signal interference (e.g., CRS interference) from interfering cells using different schemes. For some aspects, a UE may perform receiver-based interference management by performing signal cancellation (e.g., CRS cancellation). As an example, the UE may cancel the CRS from one or more interferers for PDSCH decoding. The UE may also cancel interference from one or more interferers for other signals such as physical downlink control channel (PDCCH), physical control format indicator channel (PCFICH), physical hybrid ARQ indicator channel (PHICH), physical broadcast channel (PBCH), primary synchronization signal (PSS) and/or secondary synchronization signal (SSS), and the like. In this scheme, minimal measurements may be required at a serving base station. However, UEs that are required to implement interference cancellation may incur additional implementation cost and complexity.

In another receiver-based interference management scheme, a UE may perform signal puncturing (e.g., CRS puncturing) to reduce interference from interfering cells. For example, the UE may discount some of the resources from PDSCH decoding as if those resources are punctured. As an example, while performing PDSCH decoding, the UE may discount the resources that are experiencing strong interference from signals (e.g., CRS) transmitted by other cells. For example, the UE may consider these resources to contain zero received PDSCH power (although they are used). It should be noted that resource puncturing (e.g., CRS puncturing) may not work for CRS-based PDSCH and/or colliding CRS, since there may not exist any reliable channel estimation for PDSCH decoding after puncturing. In addition, for a non-colliding CRS, some of the resource elements (REs) in symbols containing CRS may not be useful for PDSCH decoding, which may severely impact decoding performance of one or more code blocks. Therefore, the PDSCH decoding performance may be compromised by puncturing. However, the PDSCH decoding may be alleviated by hybrid automatic repeat request (HARQ) operation. It should be noted that since interference cancellation is not performed at the UE, CRS puncturing is flexible and may have a simplified UE implementation.

Another method for handling signal interference from interfering cells may be transmitter-based, in which an eNB may perform rate matching around signals of interfering cells. For example, the eNB may configure the CRE UEs such that the PDSCH transmission may not map to resources which experience strong interference from CRS transmissions of neighboring cells. However, in this scheme, some of the resource dimensions for the PDSCH transmission may be lost. In this scheme, since rate matching is performed at the eNB, UE implementation may be simpler. There may also be reduced flexibility since the eNB may be required to determine channel conditions for the UE and decide which type of rate-matching to use, which may be quite slow and subject to ambiguity during reconfiguration. For example, the eNB may decide whether to use the Rel-8 PDSCH rate matching (e.g., do not discount resources colliding with CRS of interfering cells) use another type of PDSCH rate matching (e.g., discount resources colliding with CRS of interfering cells).

For certain aspects, UEs (e.g., CRE UEs) may further be assisted by an eNB to simplify and/or improve performance of the UE receiver. Examples generally include high-layer signaling to CRE UEs to simplify implementation of cell detection, information on the number of CRS ports of neighbor cell(s) for the UE, and/or information about on which subframes in neighboring cell(s) the CRS is present (e.g., multimedia broadcast over single frequency network (MBSFN) configuration).

In Rel-11 and later releases of the LTE standard new carrier types may be introduced. For some aspects, the new carrier types may not be fully backward compatible. Motivations for such new carrier types generally include enhanced spectral efficiency, improved support for heterogeneous networks, energy efficiency, GSM re-farming, improved multimedia broadcast multicast services (MBMS), and the like. The new carrier types may have reduced legacy control signaling. For example, for the downlink and/or for TDD, the downlink subframes on a new carrier may not transmit any of the legacy control signaling and/or CRSs, or may transmit a reduced set of legacy control signaling and/or CRSs. In Rel-11, the new carriers may be associated with a backward-compatible carrier. However, these new carriers may become standalone carriers in later releases of the LTE standard. As described above, CRS in the new carrier types may be eliminated or reduced. For example, CRS may only be present in a subset of subframes, in a reduced set of symbols within a subframe, and/or only present in some subbands within a subframe.

As a result, CRS interference in LTE Rel-11 and beyond may only be present in some carriers, in some subframes, in some subbands, in some symbols (which used to carry legacy CRS), or a combination thereof. Different cells may also have different system bandwidths, different number of CRS ports, and the like. Therefore, a data channel (e.g., PDSCH) assignment or a control channel assignment (e.g., PDCCH or enhanced PDCCH) may occupy a set of resources which experience different amount of CRS interference. Aspects of the present disclosure provide techniques and apparatus for handling, within the resources of an assigned channel, different amount of CRS interference.

Figure 8:
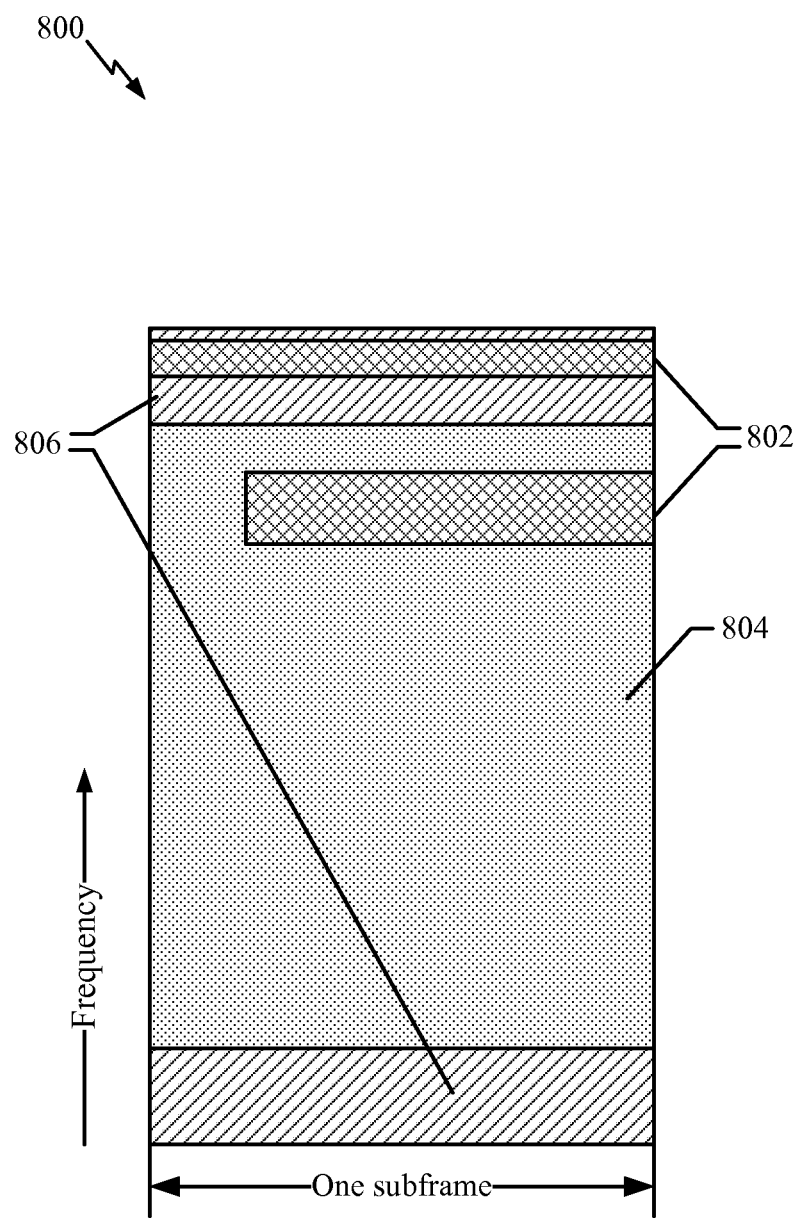
FIG. 8 illustrates an exemplary assigned downlink channel spanning multiple carriers, in accordance with certain aspects of the present disclosure.

FIG. 8 illustrates an exemplary assigned downlink channel 800 spanning multiple carriers, according to certain aspects of the present disclosure. The assigned downlink channel, such as a PDSCH assignment 802 may span both a legacy carrier type 804 and a new carrier type 806 (carrier segment). The legacy carrier 804 may be backward compatible (e.g., CRS may be present in the subframes received from neighboring cells). The new carrier 806 may not be backward compatible, and there may be no presence of CRS in the subframe. In this example, interference cancellation, punctured CRS, and/or rate matching may be performed only for the portion within the legacy carrier 804, but not on the new carrier 806.

For certain aspects, if there is reduced/mitigated presence of CRS in the subframe on the new carrier, interference cancellation may be performed on the reduced number of subframes on the new carrier who have a CRS. For certain aspects, if CRS is present in a new carrier type, it may be desirable to place the CRS in symbols other than the set of CRS symbols that are used in the legacy carrier. For example, the CRS may be placed in symbols $\{1, 5\}$ in a slot in the new carrier type instead of symbols $\{0, 4\}$ in the legacy carrier for normal cyclic prefix (CP). Placing the CRS in other symbols may improve frequency tracking.

Figure 9A:
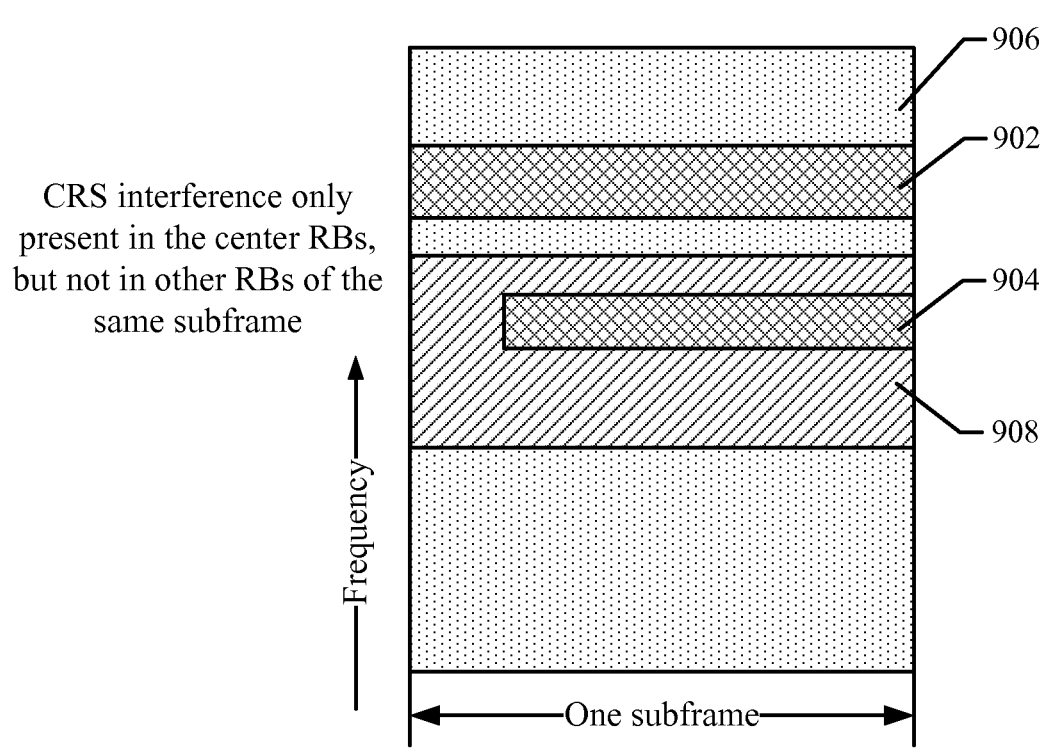
FIG. 9A illustrates an exemplary assigned downlink channel spanning different portions of resources that are subject to different types of interference, in accordance with certain aspects of the present disclosure.

FIG. 9A illustrates an exemplary assigned downlink channel spanning different portions of resources that are subject to different types/levels of interference, according to certain aspects of the present disclosure. The different portions of the resources may reside in different portions of bandwidth ("bandwidth portions") on a single carrier or on plurality of carriers that may be subject to different levels and/or types of interference. Without loss of generality, FIG. 9A illustrates an assigned downlink channel on a single carrier. The assigned downlink channel, such as a PDSCH assignment may include a first portion 902 and a second portion 904 on the same carrier in a subframe. The first portion 902 of the PDSCH assignment may reside in a first portion 906 of the bandwidth that is not subject to CRS interference. The second portion 904 of the PDSCH assignment may reside in a second portion 908 of the bandwidth that is subject to CRS interference. Therefore, the resources in the second portion 904 of the assigned downlink channel may experience CRS interference from neighboring cells. As a result, interference cancellation, puncturing, and/or rate matching may be performed only for the portion of the resources that experience CRS interference (e.g., portion 904 of the resources). Therefore, the first portion and the second portion of the resources are subject to different types/levels of interference. Hence, the interference experienced by the first portion 902 of the resources may be handled differently than the interference experienced by the second portion 904 of the resources.

Figure 9B:
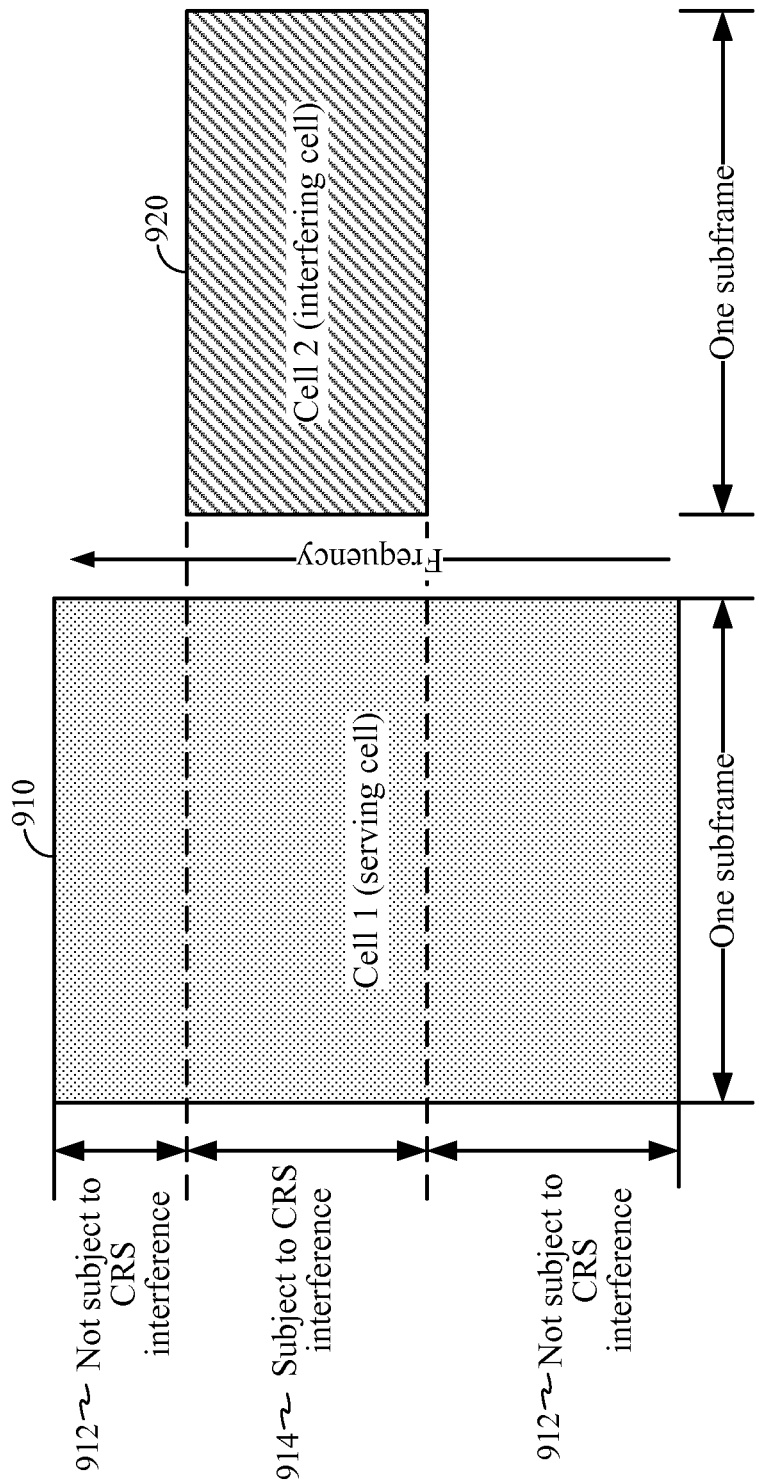
FIG. 9B illustrates two example subframes in assigned downlink channels of two neighboring cells with different bandwidths, in accordance with certain aspects of the present disclosure.

FIG. 9B illustrates two example subframes in assigned downlink channels of two neighboring cells with different bandwidths, in accordance with certain aspects of the present disclosure. As illustrated, cell 1 (serving cell) 910 may have a larger bandwidth than cell 2 (interfering cell) 920. As a results, a first portion of the bandwidth (e.g., portion 912) may not be subject to CRS interference while another portion (e.g., portion 914) of the bandwidth is subject to CRS interference from the interfering cell. Therefore, the resources in an assigned downlink channel that fall within the second portion 914 of the bandwidth may be subject to the CRS interference from the interfering cell (e.g., cell 2).

As described earlier, for certain aspect, if neighboring cells have different bandwidths (as illustrated in FIG. 9B), only a portion of the bandwidth and hence a portion of the resources may be subject to CRS interference. For another aspect, only a portion of the carrier may be configured to have CRS. For example, CRS interference may only be present in the center resource blocks (e.g., six RBs in FIG. 9A), but not in other RBs of the same subframe. As a result, different portions of the assigned resources may experience different types and/or levels of interference, which may be handled differently.

Figure 10:
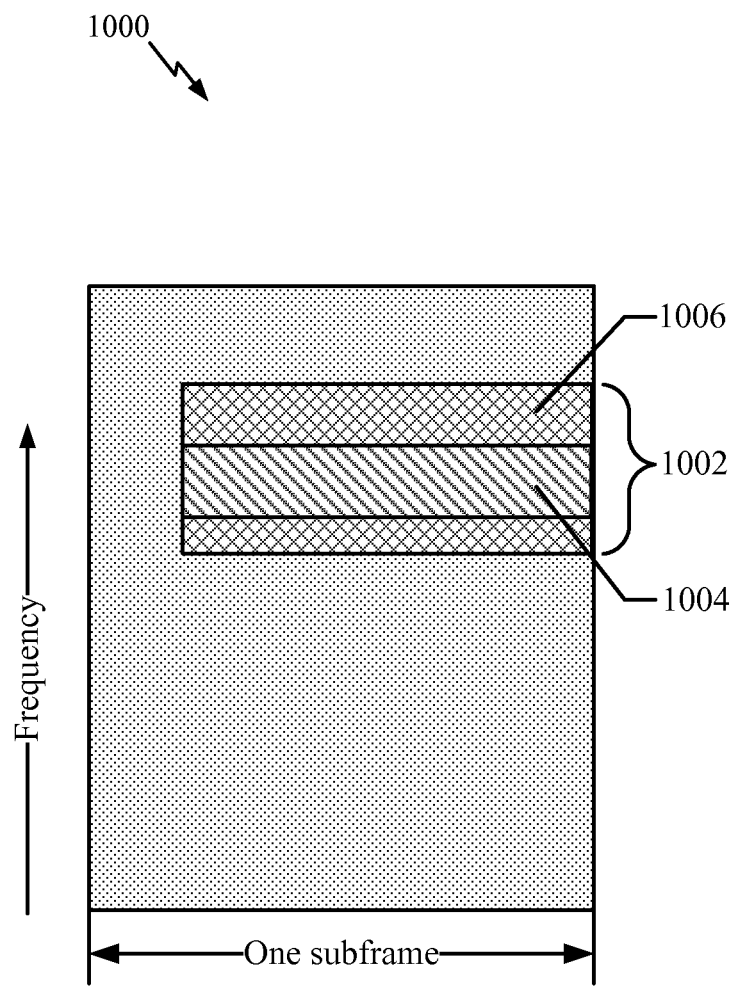
FIG. 10 illustrates an exemplary assigned downlink channel spanning different portions of resources that are subject to different types/levels of interference, in accordance with certain aspects of the present disclosure.

FIG. 10 illustrates an exemplary assigned downlink channel 1000 spanning different portions of resources that are subject to different levels of interference, according to certain aspects of the present disclosure. The assigned downlink channel, such as a PDSCH assignment 1002 may span a portion 1004 with CRS interference in symbols of a first set and another portion 1006 with CRS interference in symbols of a second set on the same carrier in a subframe. As a result, interference cancellation, or punctured CRS, and/or rate matching may be performed differently for the two portions (e.g., in the first symbol set for portion 1004 and in the second symbol set for portion 1006). The first and the second sets may contain different sets of symbols, and may or may not be a subset of each other. For example, the first set may be a subset of the second set, or the first set may contain a symbol that is not present in the second set. Additionally or separately, the number of CRS ports in different portions may be different and, consequently, should be taken into account while performing interference cancellation.

FIG. 11 illustrates example operations that may be performed by a UE for applying different interference management techniques on different portions of resources, in accordance with certain aspects of the present disclosure. At step 1102, the UE may determine different portions of resources for an assigned downlink channel (e.g., data or control channel) that are subject to at least one of different levels or different types of interference.

For some aspects, the UE may receive signaling indicating the different portions of resources. For example, the UE may be either explicitly or implicitly be informed on how to perform partial interference cancellation (IC), punctured CRS, and/or rate matching around the interference (e.g., interference related to CRS from one or more interfering cells), and other interference cancellation/mitigation techniques. The informing may be performed by RRC or OAM, or be predetermined (e.g., hardcoded by specifications). As another example, the UE may be informed by dynamic signaling (e.g., indicated on a control channel). For instance, the actual configuration of CRS in an extension carrier (or carrier segment) of neighboring cell(s) may be indicated to a UE by dynamic signaling.

For some aspects, the UE may determine the different portions of the resources by performing blind detection of resources for the assigned downlink channel (e.g., blind detection of the characteristics of the CRS interference). The characteristics of the CRS interference may be RB-dependent, or may have a coarser granularity (e.g., subband dependent). For certain aspects, the different portions of resources that are subject to at least one of different levels or different types of interference may reside in different portions of bandwidth.

At step 1104, the UE may select different techniques for processing the different portions of resources, wherein each technique is selected based on the corresponding level or type of interference. For some aspects, each technique may be selected further based on at least one of a subframe type, a carrier type, a common reference signal (CRS) configuration, bandwidths of cells, number of CRS ports and/or other parameters. The different techniques generally include interference cancellation, puncturing, rate matching, no interference reduction, and/or any other interference cancellation/mitigation method and/or a combination thereof.

For some aspects, at least a first portion of the resources may be subject to interference related to CRSs from one or more interfering cells (e.g., as illustrated in FIGS. 8 and 9). For certain aspects, a second portion of the resources may include little or no CRS transmissions. Selecting the different techniques may generally include selecting a technique to reduce the interference in the first portion of the resources.

For some aspects, the resources for the assigned downlink channel may span a plurality of carriers, and interference may be reduced for a portion of the resources in at least one of the plurality of carriers (e.g., FIG. 8). A first technique may be selected for processing the portion of the resources in which interference is reduced, and at least a second technique may be selected for processing one or more other portions of the resources (e.g., interference cancellation, puncturing, rate matching, and/or no interference reduction).

Optionally, at step 1106, the UE may decode the downlink channel by processing the different portions of the resources using the corresponding selected techniques.

For certain aspects, CRS interference may be uniform for a particular assigned downlink channel (e.g., PDSCH assignment). For example, an eNB may ensure, by specification or by signaling, that different availability of CRS interference is not allowed within a data and/or control channel. For certain aspects, the UE may assume or select a maximum amount of CRS interference across the entire data and/or control channel assignment, even if the actual CRS interference is limited to fewer number of resources in some portion of the assignment. Such assumed or selected interference may not be based on LTE Rel-8/9/10. In aspects, such assumed or selected interference may be based on a received or provided configuration.

FIG. 12 illustrates example operations 1200 that may be performed by a UE for managing interference (e.g., cancelling, mitigating, and the like) in assigned resources, in accordance with certain aspects of the present disclosure. At step 1202, the UE may determine different portions of resources for an assigned downlink channel that are subject to at least one of different levels or different types of interference (e.g., actual interference). For certain aspects, different portions of bandwidth may be subject to different levels or different types of interference which may result in the different portions of resources being subject to different levels or different types of interference.

At step 1204, the UE may select a fixed pattern or amount of interference for the resources based on the different levels or the different types of interference, wherein the fixed pattern or amount of interference may comprise one or more interference levels that are equal to or greater than one or more of the different levels of interference. At step 1206, the UE may select a technique for processing the resources. The technique may be selected based on the selected fixed pattern or amount of interference.

As described above, the UE may select a maximum amount of CRS interference for the entire data/control channel assignment, even if the actual CRS interference is limited to a fewer number of resources in some portion of the assignment. The UE may then decode the downlink channel by processing the resources using the selected technique.

For certain aspects, the selected technique may include interference cancellation, puncturing, rate matching, and/or no interference reduction. For certain aspects, the technique may be selected based on a subframe type, a carrier type, a common reference signal (CRS) configuration, bandwidths of cells and/or number of CRS ports, and the like.

For certain aspects, the resources for the assigned downlink channel may span multiple carriers. The interference may be reduced for the resources in at least one of the multiple carriers. For certain aspects, the UE may receive signaling indicating the different portions of the resources. The UE may also perform blind detection on the resources for the assigned downlink channel.

Figure 13:
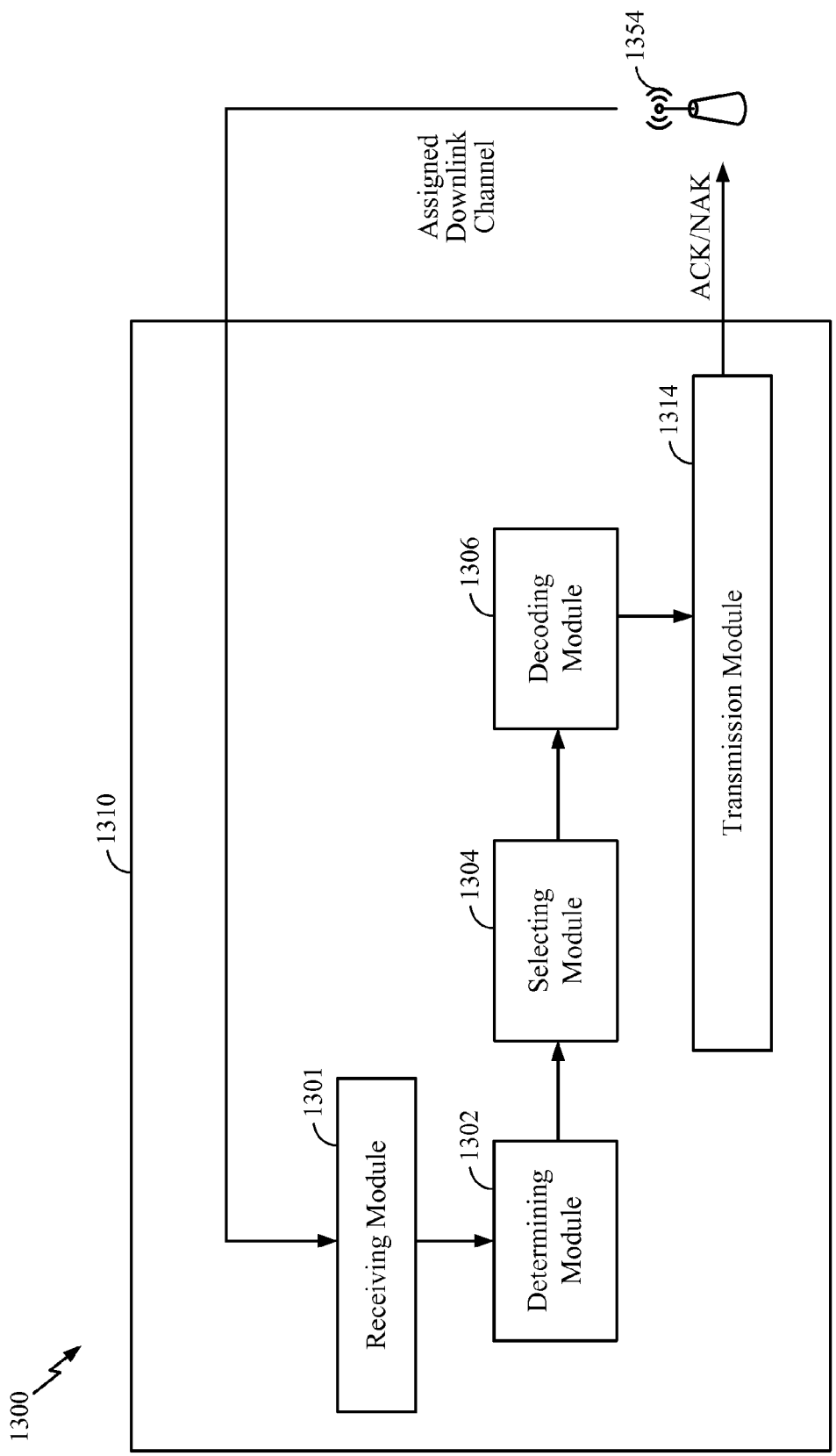
FIG. 13 is a conceptual data flow diagram illustrating the data flow between different modules/means/components in an exemplary apparatus, in accordance with certain aspects of the present disclosure.

FIG. 13 is a conceptual data flow diagram 1300 illustrating the data flow between different modules/means/components in an exemplary apparatus 1310. The apparatus 1310 includes a module 1302 that determines different portions of resources for an assigned downlink channel that are subject to at least one of different levels or different types of interference, a module 1304 that selects different techniques for processing the different portions of resources, wherein each technique is selected based on the corresponding level or type of interference, and a module 1306 that decodes the downlink channel by processing the different portions of the resources using the corresponding selected techniques. Transmissions on the assigned downlink channel may originate from an eNB 1354 and be received at a receiving module 1301 of the apparatus 1310. A transmission module 1314 may transmit an acknowledgment of the transmission received.

The apparatus may include additional modules that perform each of the steps of the algorithm in the aforementioned operations in FIGS. 11 and 12. As such, each step in the aforementioned operations in FIGS. 11 and 12 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 14:
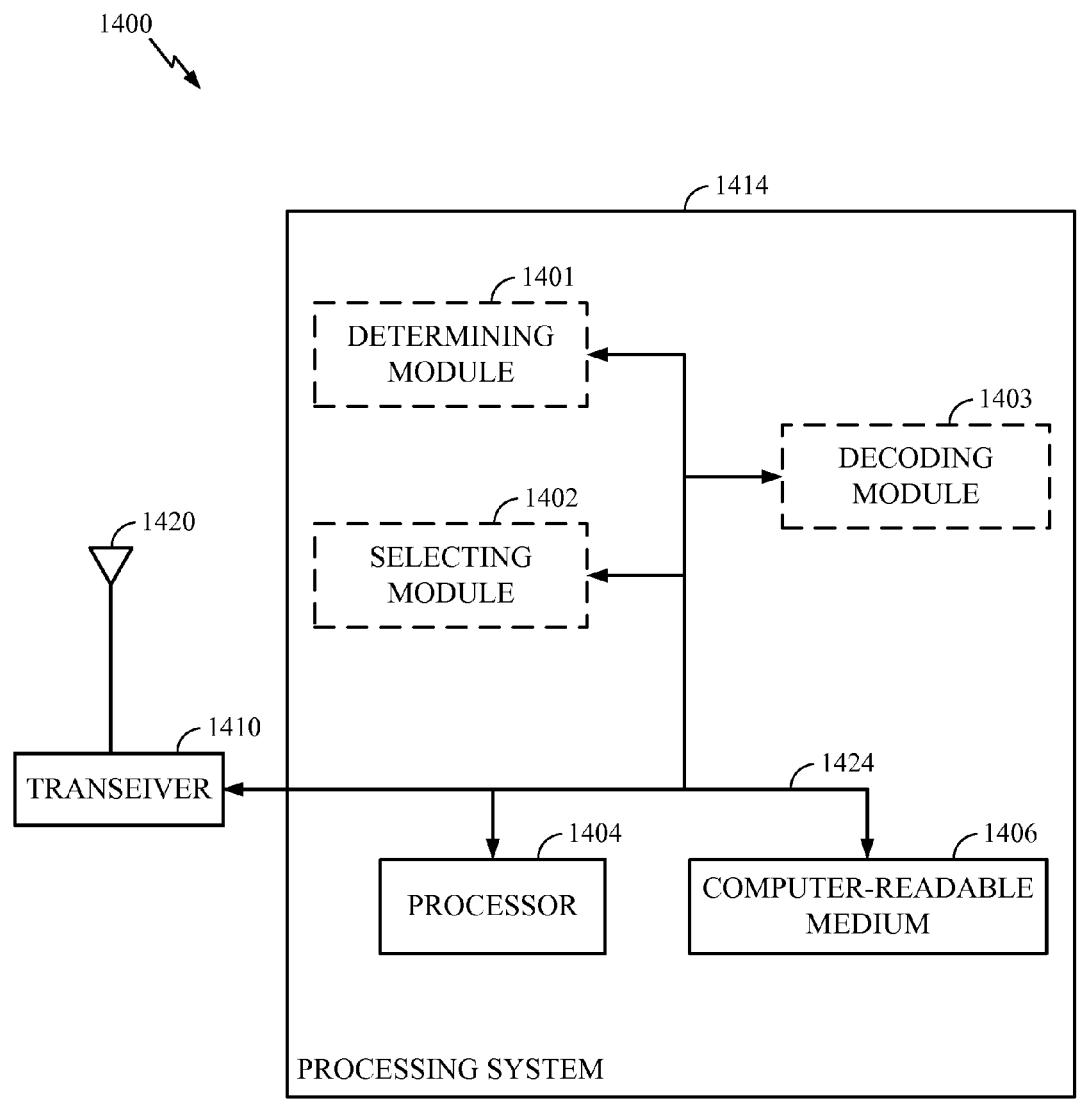
FIG. 14 is a diagram illustrating an example of a hardware implementation for an apparatus employing a processing system, in accordance with certain aspects of the present disclosure.

FIG. 14 is a diagram illustrating an example of a hardware implementation for an apparatus 1400 employing a processing system 1414. The processing system 1414 may be implemented with a bus architecture, represented generally by the bus 1424. The bus 1424 may include any number of interconnecting buses and bridges depending on the specific application of the processing system 1414 and the overall design constraints. The bus 1424 links together various circuits including one or more processors and/or hardware modules, represented by the processor 1404, the modules 1401, 1402, 1403, and the computer-readable medium 1406. The bus 1424 may also link various other circuits such as timing sources, peripherals, voltage regulators, and power management circuits, which are well known in the art, and therefore, will not be described any further.

The apparatus includes a processing system 1414 coupled to a transceiver 1410. The transceiver 1410 is coupled to one or more antennas 1420. The transceiver 1410 provides a means for communicating with various other apparatus over a transmission medium. The processing system 1414 includes a processor 1404 coupled to a computer-readable medium 1406. The processor 1404 is responsible for general processing, including the execution of software stored on the computer-readable medium 1406. The software, when executed by the processor 1404, causes the processing system 1414 to perform the various functions described supra for any particular apparatus. The computer-readable medium 1406 may also be used for storing data that is manipulated by the processor 1404 when executing software. The processing system further includes modules 1401, 1402, and 1403. The modules may be software modules running in the processor 1404, resident/stored in the computer readable medium 1406, one or more hardware modules coupled to the processor 1404, or some combination thereof. The processing system 1414 may be a component of the UE 650 and may include, for example, the memory 660 and/or at least one of the TX processor 668, the RX processor 656, and the controller/processor 659.

In one configuration, the apparatus 1310/1400 for wireless communication includes means for determining, selecting, decoding, and assuming. The aforementioned means may be one or more of the aforementioned modules of the apparatus 1310 and/or the processing system 1414 of the apparatus 1400 configured to perform the functions recited by the aforementioned means. As described supra, the processing system 1414 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

As used herein, a phrase referring to "at least one of" a list of items refers to any combination of those items, including single members. As an example, "at least one of: a, b, or c" is intended to cover: a, b, c, a-b, a-c, b-c, and a-b-c.

What is claimed is:

1. A method for wireless communications, comprising:
   determining different portions of resources for an assigned downlink channel that are subject to at least one of different levels or different types of interference; and
   selecting different techniques for processing the different portions of the resources, wherein each technique is selected based at least on a corresponding level or type of interference.

2. The method of claim 1, further comprising:
   decoding the downlink channel by processing the different portions of the resources using the corresponding selected techniques.

3. The method of claim 1, wherein at least a first portion of the resources is subject to interference related to common reference signals (CRSs) from one or more interfering cells.

4. The method of claim 3, wherein selecting the different techniques for processing the different portions of the resources comprises:
   selecting a technique to reduce the interference in the first portion of the resources.

5. The method of claim 3, wherein:
   a second portion of the resources includes little or no CRS transmissions.

6. The method of claim 1, wherein:
   the resources for the assigned downlink channel span a plurality of carriers; and
   interference is reduced for a portion of the resources in at least one of the plurality of carriers.

7. The method of claim 6, wherein:
   a first technique is selected for processing the portion of the resources in which interference is reduced; and
   at least a second technique is selected for processing one or more other portions of the resources.

8. The method of claim 7, wherein the second technique comprises at least one of interference cancellation, puncturing, rate matching, or no interference reduction.

9. The method of claim 1, wherein each technique is selected further based on at least one of a subframe type, a carrier type, a common reference signal (CRS) configuration, bandwidths of cells, or a number of CRS ports.

10. The method of claim 1, wherein determining the different portions of the resources comprises receiving signaling indicating the different portions.

11. The method of claim 1, wherein determining the different portions of the resources comprises performing blind detection of resources for the assigned downlink channel.

12. The method of claim 1, wherein the different techniques comprise a plurality of interference cancellation, puncturing, rate matching, or no interference reduction.

13. The method of claim 1, wherein the different portions of the resources comprise:
    a first portion of the resources associated with a first symbol in a subframe from a carrier; and
    a second portion of the resources associated with a second symbol in the subframe from the carrier.

14. The method of claim 1, wherein the downlink channel is a data channel or a control channel.

15. The method of claim 1, wherein the different portions of the resources that are subject to the at least one of different levels or different types of interference reside in different portions of bandwidth that are subject to the at least one of different levels or different types of interference.

16. A method for wireless communications, comprising:
    determining different portions of resources for an assigned downlink channel that are subject to at least one of different levels or different types of interference;
    selecting a fixed pattern or amount of interference for the resources based on the different levels or the different types of interference, wherein the fixed pattern or amount of interference comprises one or more interference levels that are greater than one or more of the different levels of interference; and
    selecting a technique for processing the resources, wherein the technique is selected based on the selected fixed pattern or amount of interference.

17. The method of claim 16, further comprising:
    decoding the downlink channel by processing the resources using the selected technique.

18. The method of claim 16, wherein:
the resources for the assigned downlink channel span a plurality of carriers; and
interference is reduced for the resources in at least one of the plurality of carriers.

19. The method of claim 16, wherein the technique is selected further based on at least one of a subframe type, a carrier type, a common reference signal (CRS) configuration, bandwidths of cells, or a number of CRS ports.

20. The method of claim 16, wherein determining the different portions of the resources comprise receiving signaling indicating the different portions.

21. The method of claim 16, wherein determining the different portions of the resources comprise performing blind detection of resources for the assigned downlink channel.

22. The method of claim 16, wherein the technique comprises one or more of interference cancellation, puncturing, rate matching, or no interference reduction.

23. The method of claim 16, wherein the different portions of the resources that are subject to the at least one of different levels or different types of interference reside in different portions of bandwidth that are subject to the at least one of different levels or different types of interference.

24. An apparatus for wireless communications, comprising:
means for determining different portions of resources for an assigned downlink channel that are subject to at least one of different levels or different types of interference; and
means for selecting different techniques for processing the different portions of the resources, wherein each technique is selected based at least on a corresponding level or type of interference.

25. The apparatus of claim 24, further comprising:
means for decoding the downlink channel by processing the different portions of the resources using the corresponding selected techniques.

26. The apparatus of claim 24, wherein at least a first portion of the resources is subject to interference related to common reference signals (CRSs) from one or more interfering cells.

27. The apparatus of claim 26, wherein the means for selecting the different techniques for processing the different portions of the resources comprises:
means for selecting a technique to reduce the interference in the first portion of the resources.

28. The apparatus of claim 26, wherein:
a second portion of the resources includes little or no CRS transmissions.

29. The apparatus of claim 24, wherein:
the resources for the assigned downlink channel span a plurality of carriers; and
interference is reduced for a portion of the resources in at least one of the plurality of carriers.

30. The apparatus of claim 29, wherein:
a first technique is selected for processing the portion of the resources in which interference is reduced; and
at least a second technique is selected for processing one or more other portions of the resources.

31. The apparatus of claim 30, wherein the second technique comprises at least one of interference cancellation, puncturing, rate matching, or no interference reduction.

32. The apparatus of claim 24, wherein each technique is selected further based on at least one of a subframe type, a carrier type, a common reference signal (CRS) configuration, bandwidths of cells, or a number of CRS ports.

33. The apparatus of claim 24, wherein the means for determining the different portions of the resources comprises means for receiving signaling indicating the different portions.

34. The apparatus of claim 24, wherein the means for determining the different portions of the resources comprises means for performing blind detection of resources for the assigned downlink channel.

35. The apparatus of claim 24, wherein the different techniques comprise a plurality of interference cancellation, puncturing, rate matching, or no interference reduction.

36. The apparatus of claim 24, wherein the different portions of the resources comprise:
a first portion of the resources associated with a first symbol in a subframe from a carrier; and
a second portion of the resources associated with a second symbol in the subframe from the carrier.

37. The apparatus of claim 24, wherein the downlink channel is a data channel or a control channel.

38. The apparatus of claim 24, wherein the different portions of the resources that are subject to the at least one of different levels or different types of interference reside in different portions of bandwidth that are subject to the at least one of different levels or different types of interference.

39. An apparatus for wireless communications, comprising:
means for determining different portions of resources for an assigned downlink channel that are subject to at least one of different levels or different types of interference;
means for selecting a fixed pattern or amount of interference for the resources based on the different levels or the different types of interference, wherein the fixed pattern or amount of interference comprises one or more interference levels that are greater than one or more of the different levels of interference; and
means for selecting a technique for processing the resources, wherein the technique is selected based on the selected fixed pattern or amount of interference.

40. The apparatus of claim 39, further comprising:
means for decoding the downlink channel by processing the resources using the selected technique.

41. The apparatus of claim 39, wherein:
the resources for the assigned downlink channel span a plurality of carriers; and
interference is reduced for the resources in at least one of the plurality of carriers.

42. The apparatus of claim 39, wherein the technique is selected further based on at least one of a subframe type, a carrier type, a common reference signal (CRS) configuration, bandwidths of cells, or a number of CRS ports.

43. The apparatus of claim 39, wherein the means for determining the different portions of the resources comprise receiving signaling indicating the different portions.

44. The apparatus of claim 39, wherein the means for determining the different portions of the resources comprise means for performing blind detection of resources for the assigned downlink channel.

45. The apparatus of claim 39, wherein the technique comprises one or more of interference cancellation, puncturing, rate matching, or no interference reduction.

46. The apparatus of claim 39, wherein the different portions of the resources that are subject to the at least one of different levels or different types of interference reside in different portions of bandwidth that are subject to the at least one of different levels or different types of interference.

47. A computer-program product for wireless communications, comprising a non-transitory computer readable medium having instructions stored thereon, the instructions being executable by one or more processors and the instructions comprising:
    instructions for determining different portions of resources for an assigned downlink channel that are subject to at least one of different levels or different types of interference; and
    instructions for selecting different techniques for processing the different portions of the resources, wherein each technique is selected based at least on a corresponding level or type of interference.

48. A computer-program product for wireless communications, comprising a non-transitory computer readable medium having instructions stored thereon, the instructions being executable by one or more processors and the instructions comprising:
    instructions for determining different portions of resources for an assigned downlink channel that are subject to at least one of different levels or different types of interference;
    instructions for selecting a fixed pattern or amount of interference for the resources based on the different levels or the different types of interference, wherein the fixed pattern or amount of interference comprises one or more interference levels that are greater than one or more of the different levels of interference; and
    instructions for selecting a technique for processing the resources, wherein the technique is selected based on the selected fixed pattern or amount of interference.

49. An apparatus for wireless communications, comprising:
    at least one processor configured to:
        determine different portions of resources for an assigned downlink channel that are subject to at least one of different levels or different types of interference, and
        select different techniques for processing the different portions of the resources, wherein each technique is selected based at least on a corresponding level or type of interference; and
    a memory coupled to the at least one processor.

50. An apparatus for wireless communications, comprising:
    at least one processor configured to:
        determine different portions of resources for an assigned downlink channel that are subject to at least one of different levels or different types of interference,
        select a fixed pattern or amount of interference for the resources based on the different levels or the different types of interference, wherein the fixed pattern or amount of interference comprises one or more interference levels that are greater than one or more of the different levels of interference, and
        select a technique for processing the resources, wherein the technique is selected based on the selected fixed pattern or amount of interference; and
    a memory coupled to the at least one processor.

* * * * *